(12) United States Patent
Chan et al.

(10) Patent No.: US 6,937,573 B2
(45) Date of Patent: Aug. 30, 2005

(54) METHOD AND APPARATUS FOR VARIABLE FRAME SIZE RADIOLINK PROTOCOL BASED ON CHANNEL CONDITION ESTIMATION

(75) Inventors: Joseph C. Chan, San Diego, CA (US); Chi-ping Nee, Santee, CA (US); Chinh Tran, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 857 days.

(21) Appl. No.: 09/758,484

(22) Filed: Jan. 10, 2001

(65) Prior Publication Data

US 2002/0089935 A1 Jul. 11, 2002

(51) Int. Cl.[7] .................................................. H04J 1/16
(52) U.S. Cl. ........................ 370/252; 370/328; 370/437
(58) Field of Search ................................. 370/347, 252, 370/474, 449, 228, 395.1, 400, 328, 432, 437, 428, 242, 231, 469, 395.6; 375/136, 202, 296; 714/708, 746

(56) References Cited

U.S. PATENT DOCUMENTS 6,359,877 B1 * 3/2002 Rathonyi et al. ........... 370/349
6,480,497 B1 * 11/2002 Flammer et al. ............ 370/400
6,542,490 B1 * 4/2003 Ahmadvand et al. ....... 370/338
6,646,987 B1 * 11/2003 Qaddoura .................... 370/231
6,704,346 B1 * 3/2004 Mansfield .................... 375/136

* cited by examiner

Primary Examiner—John Pezzlo
(74) Attorney, Agent, or Firm—Blakely Sokoloff Taylor & Zafman

(57) ABSTRACT

The present invention provides several methods and apparatuses for varying the size of a radiolink protocol (RLP) packet based on channel condition estimation. According to one aspect, a channel condition metric is generated to indicate a channel condition. The channel condition metric is processed to determine the optimal packet-size for the channel condition. An optimal RLP packet-size that corresponds to the processed channel condition metric is chosen. All the optimal RLP packets that are control type are equipped with CRC bits and sent to the requester. Sending an optimal RLP packet helps maximize system throughput and adding CRC bits to the control type RLP packets prevents the RLP packet from getting rejected due to bit errors.

32 Claims, 7 Drawing Sheets

METHOD AND APPARATUS FOR VARIABLE FRAME SIZE RADIOLINK PROTOCOL BASED ON CHANNEL CONDITION ESTIMATION

FIELD OF THE INVENTION

The present invention relates to code division multiple access techniques. More particularly, the present invention relates to increasing system throughput by varying the packet-size of radio link protocol.

INTRODUCTION AND BACKGROUND OF THE INVENTION

Code division multiple access (CDMA) technology has improved tremendously since its inception. Today, CDMA systems use radio link protocol (RLP) packets to send data at high speeds. Currently fixed packet-size is used for transferring data. Current practices involve placing a single packet of fixed size in a frame and sending the frame to fit a channel condition. The frames used include a cyclic redundancy check (CRC) for detecting error in the frame.

Channel conditions differ greatly in a system. A channel may be operating under good, bad, or other various intermediate conditions. A channel may also be prone to more error when there is interference or propagation loss. For example interference from other users will add noise that is distributed normally and effects the condition of the channel. Multi-path conditions that occur between a system and a mobile unit adding bursts of noise when the mobile is in motion may also cause interference. Various external or internal features of a system may also vary the channel conditions.

There are many disadvantages to using a fixed packet-size for sending data. One disadvantage to using a fixed packet-size is that the packet-size may not fit a particular channel condition and get rejected. For example in a good channel condition a longer packet-size is preferred due to low CRC overhead and in a bad channel condition a shorter packet-size is preferred due to low transmission overhead. Sending a fixed packet-size for all the conditions creates difficulty due to power and system overloads, furthermore, the fixed size may frequently not fit the particular channel condition thereby resulting in the packet being rejected.

Another disadvantage of using a fixed packet-size in a frame equipped with a CRC error detection system is that any frame that does not pass the CRC is completely discarded. A frame does not pass CRC if the packet-size within the frame does not match the allowable size for the current channel condition. For example a large frame with a large packet-size may have a couple of bit errors because it does not fit the current channel condition, thus, the frame will be discarded completely, wasting all the information in the frame.

In addition when a channel is prone to more error the chance of receiving a fixed size packet correctly decreases, further if a packet is sent during this period which doesn't comply with allowable packet-size for the current channel condition it will be rejected.

SUMMARY OF THE INVENTION

The present invention provides several embodiments of methods and apparatuses for varying the size of a radiolink protocol (RLP) packet based on channel condition estimation. According to one embodiment, a channel condition metric is generated to indicate a channel condition. The channel condition metric is processed to determine the optimal packet-size for the channel condition. An optimal RLP packet-size that corresponds to the processed channel condition metric is chosen. All the optimal RLP packets that are control type are equipped with CRC bits and sent to the requestor. Sending an optimal RLP packet helps maximize system throughput and adding CRC bits to the control type RLP packets prevents the RLP packet from getting rejected due to bit errors.

BRIEF DESCRIPTION OF THE DRAWINGS

The objects, features, and advantages of the present invention will be apparent to one skilled in the art from the following detailed description in which.

DETAILED DESCRIPTION

Figure 1:
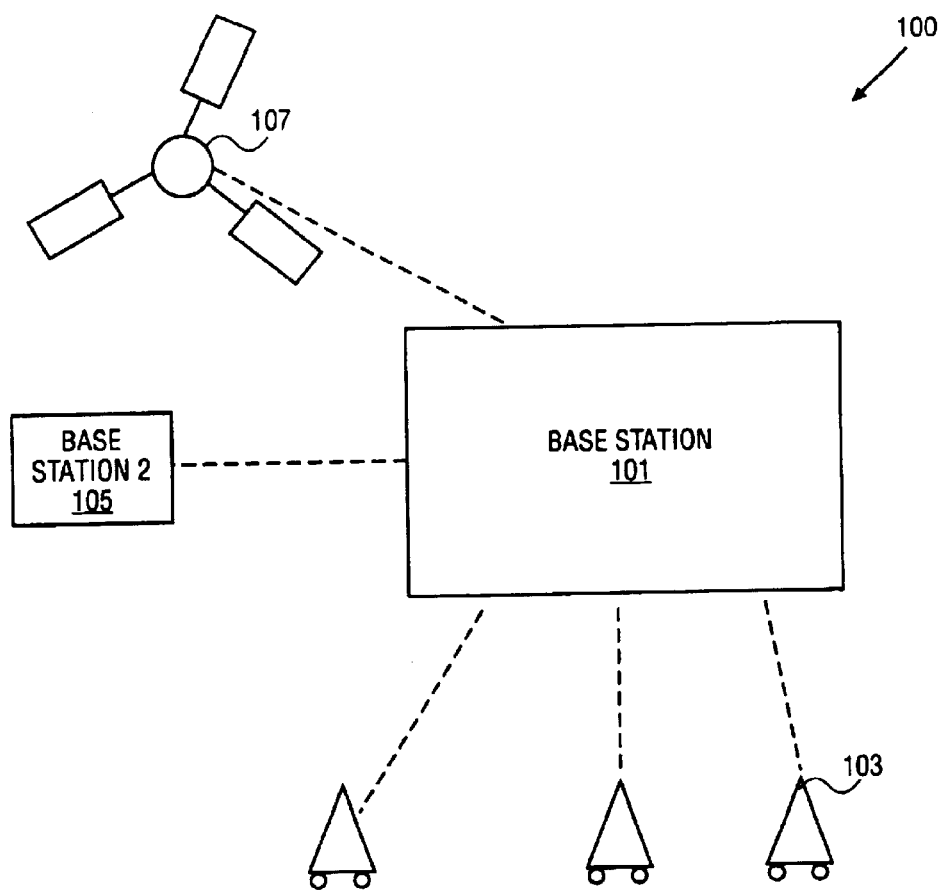
FIG. 1 is a system in which the present invention is practiced according to one embodiment.

A method and apparatus for variable packet-size radiolink protocol (RLP) based upon channel condition estimation is described. In one embodiment, the method and apparatus is used in a mobile communication system which typically a base unit or bus station and/or more mobile units. In one embodiment, a channel condition metric is generated to indicate a channel condition. The channel condition metric is processed to determine the optimal packet-size for the channel condition. An optimal RLP packet-size that corresponds to the processed channel condition metric is then chosen. A RLP packet that is a control type is equipped with CRC bits and is sent to the requester.

By varying packet-size, a packet that is optimal in size is properly matched to a particular channel condition. Since channel conditions can vary and are sensitive to packet-size, the packet size of each packet can be modified to match the current channel condition. This allows the channel to accept the delivered packet and eliminated packet rejection caused by incompatible packet sizes. In addition, by varying packet-size to suit a channel condition, system efficiency is increased and the system operates at a faster rate to increase system throughput.

Placing at least one CRC bit in each RLP packet that is a control type aids in detection of bit errors within the packet. The error correction occurs when a corrupted RLP packet having bit errors is detected, requested, retransmitted, and received without detection of errors and allows an optimal packet-size to be obtained for the current channel condition.

In addition, placing CRC bits in the packet increases system throughput by minimizing the frequency an RLP packet is rejected due to a few errors by correcting the bit errors in the RLP packet and making the RLP packet compatible for the channel condition. Having an error free RLP packet reduces system processing time and increases system efficiency.

In the method and apparatus of the present invention the data transmission system described is a CDMA system. However it is readily apparent to one skilled in the art that other systems and devices which have the capability of receiving and sending data packets in a channel condition environment may utilize the method and apparatus of the present invention. Furthermore, in the following description, for purposes of explanation, numerous details are set forth, such as a channel condition estimator, packet-size optimization logic, packet-size alteration logic, physical layer frame, requesters, flowcharts, and system configurations, etc. in order to provide a thorough understanding of the present invention. However, it will be apparent to one skilled in the art that these specific details are not required in order to practice the present invention. In other instances, well-known electrical structures and circuits are shown in block diagram form in order not to necessarily obscure the present invention.

It is readily apparent to one skilled in the art that additional functions can be added to the process and functions modified or removed and still be within the spirit and scope of the invention. The system provides a variable RLP packet to fit any particular channel condition.

FIG. 1 is a system 100 in which the present invention is practiced according to one embodiment. System 100 include a base station 101, a plurality of mobile stations 103 in communication with base station 101, a satellite 107 in communication with base station 101, and a second base station 105 in communication with base station 101. RLP packet communication may occur directly between a base station 101 and a mobile station 103. Alternatively packet communication may occur between one mobile station 103 and another mobile station by using a base station 101 that supports both mobile stations 103. In another embodiment, base station 101 may communicate with another base station 105 directly or through a satellite 105 for sending or receiving data packets.

Figure 2:
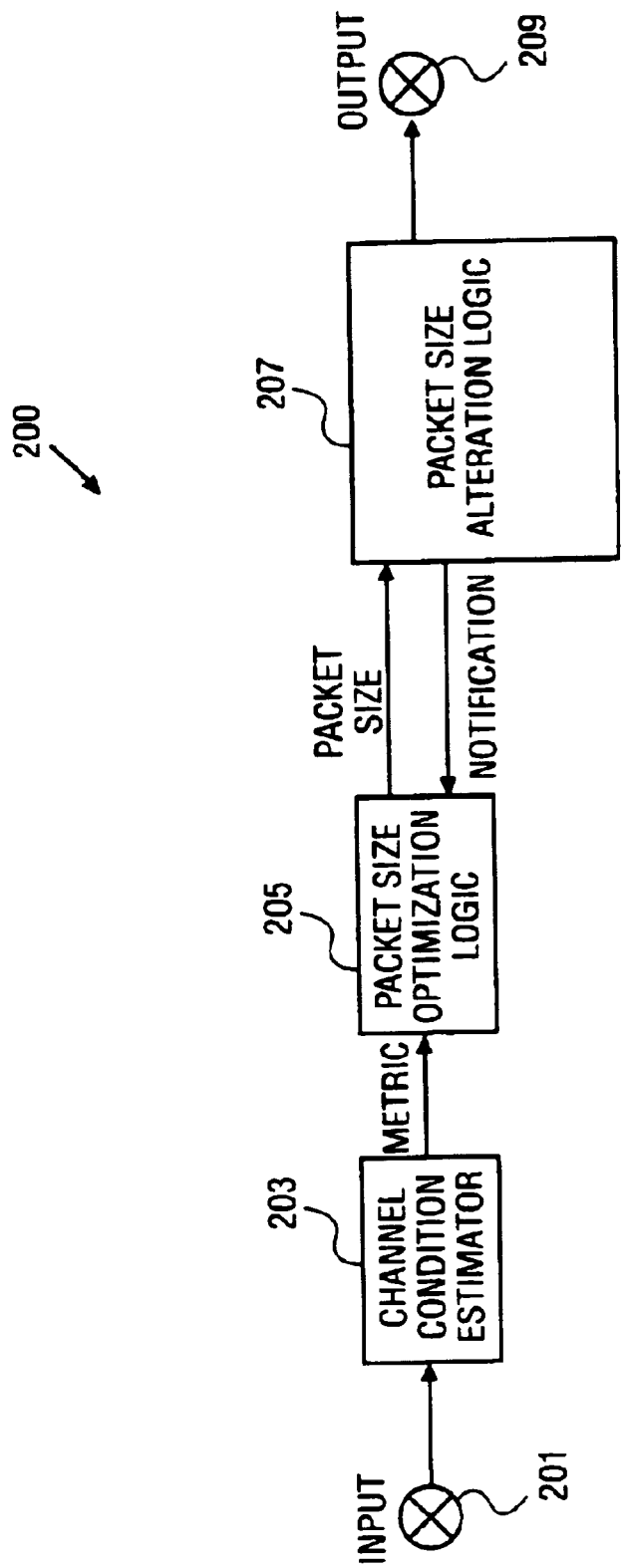
FIG. 2 is a block diagram of an exemplary packet-size optimization processing system according to one embodiment.

FIG. 2 is a block diagram of an exemplary packet-size optimization processing system 200 for practicing the invention. The packet-size optimization processing system 200 processes an RLP packet to an appropriate size that fits a channel condition. The packet optimization processing system 200 includes an input 210, a channel condition estimator 203 coupled to the input, a packet-size optimization logic 205 coupled to the channel condition estimator 203, a packet-size alteration logic 207 coupled to the packet-size optimization logic 205, and an output 209 that is produced as a result of the packet-size optimization process is coupled to the packet-size optimization logic 205. Items of packet optimization processing system 200 could be presented as circuitry or software or a combination of both.

In one embodiment, the system is performed by a processor and associated support logic. In this embodiment, the processor executes code stored in memory or other computer readable medium to perform the processes described herein.

A channel condition estimator 203 performs operations to generate a channel condition metric that can be used to select a packet-size that maximizes data throughput of a system. The channel condition estimator 203 coupled to an input 201 receives a bitstream containing RLP packets. The received bitstream of baseband signal can be used to estimate the channel condition. The RLP packets contain data and come in various packet sizes. The channel condition estimator 203 analyzes the bitstream and produces a channel condition metric. Alternatively, in a CDMA system, the "I" (in-phase) and "Q" (quadrature-phase) component of the baseband signal is sampled. The sampled signal includes chips. The chips are despread and accumulated and referred to as symbols. The symbols undergo forward error correction and become bits. The data for the symbols is derived from the sampled baseband signal and used to estimate channel condition.

The channel condition metric is a representation of the current channel condition during the flow of the current bitstream. One embodiment of the operations performed by the channel condition estimator 203 for analyzing the bitstream and producing a channel condition metric are further described in FIG. 4.

packet-size optimization logic 205 coupled to the channel condition estimator 203 receives the channel condition metric processed by the channel condition estimator 203. The packet-size optimization logic 205 processes the RLP packets within the bitstream according to the received channel condition metric. The process results in obtaining an optimal packet-size for each RLP packet. One embodiment of, the operations performed by the packet-size optimization logic 205 for obtaining an optimal RLP packet-size are further described in FIG. 6.

Packet-size alteration logic 207 coupled to the packet-size optimization logic 205 receives the RLP packet information from the packet-size optimization logic 205. Packet-size alteration logic 207 processes the information and notifies the packet-size optimization logic 205 using existing control messages to change packet-size for attaining optimal packet-size. The operations performed by the packet-size alteration logic 207 for altering and notifying for change of packet-size are further described in FIG. 6.

An output 209 coupled to the packet-size alteration logic 207 is produced as a result of the packet optimization process. The output is an RLP packet that has been modified to obtain an optimal packet-size and satisfies the current channel condition.

Figure 3:
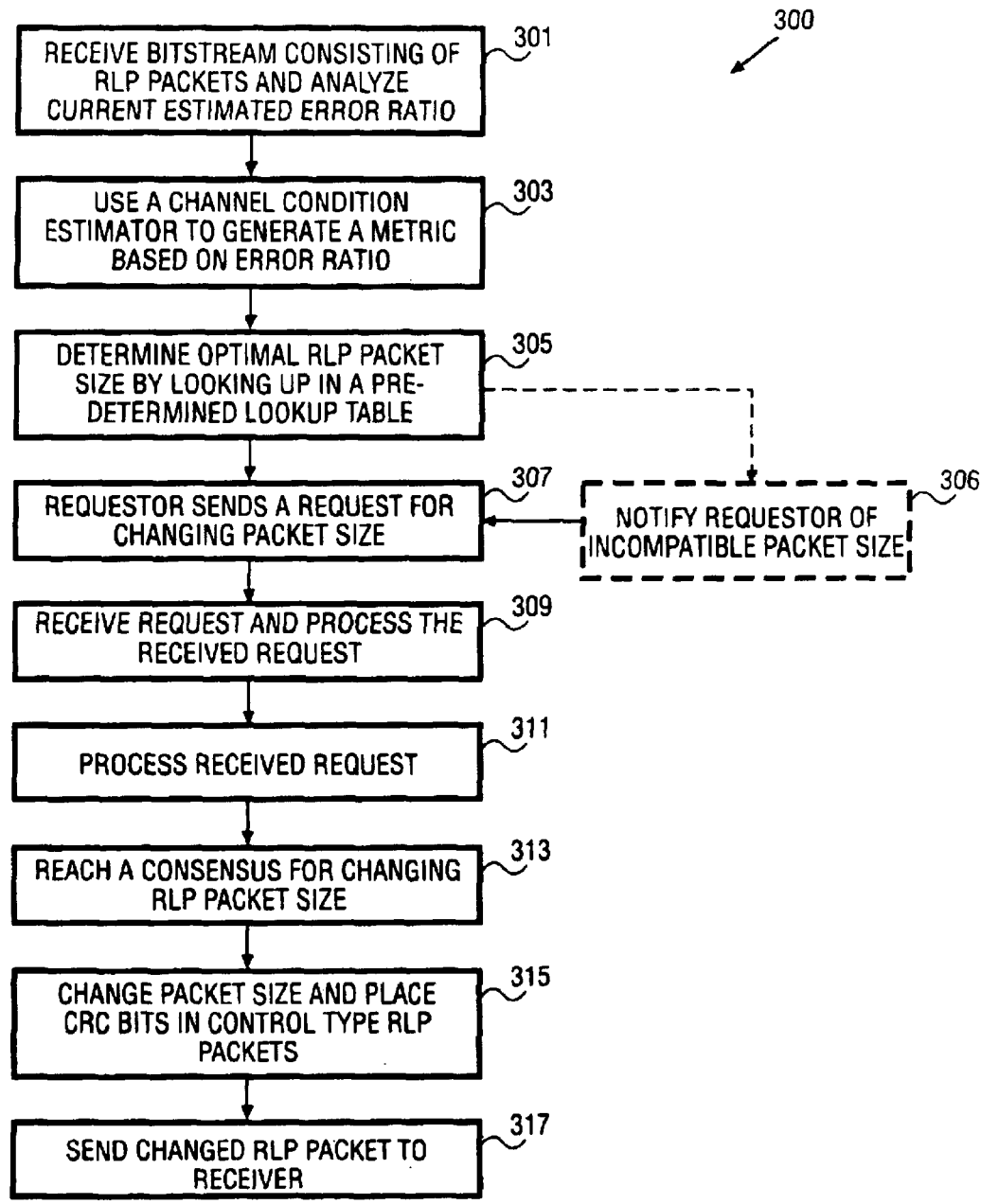
FIG. 3 is a flow chart of one embodiment of an operation to convert the size of a packet received in a bitstream to an optimal size suitable for a channel condition according to one embodiment.

FIG. 3 is a flow chart of an operation 300 to convert the size of a packet received in a bitstream to an optimal size suitable for a channel condition according to one embodiment. Operation 300 can be implemented by digital processing system 700. Operation 300 also allows an algorithm to receive RLP packets, process the RLP packets by comparing it with current channel condition, modifying the RLP packets to attain one optimal packet-size, and sending the optimized RLP packet to a requestor.

Referring to FIG. 3, at operation block 301, a current bitstream containing RLP packets is received. A portion of the bitstream entering the channel condition estimator 203 through an input 201 is analyzed for errors. The analysis produces an estimated error rate that represents the entire bitstream.

At operation block 303, a channel condition estimator 203 is used to process the estimated error rate of the bitstream. The channel condition estimator 203 uses the estimated error rate to generate a metric. The metric is a channel condition metric that represents the current channel condition during the flow the current bitstream. The operations performed by the channel condition estimator 203 for analyzing the bitstream and producing a metric are further described in FIG. 4.

At operation block 305, an optimal packet-size is determined. IN one embodiment, an optimal packet-size is determined by comparing the size of the current RLP packet received in the current bitstream to a predetermined optimal packet-size. In one embodiment, the comparison is performed by comparing the channel condition metric value generated for the current RLP packet in the current bitstream with a predefined channel condition metric corresponding to an optimal packet-size. The comparison produces a result indicating whether the current RLP packet-size is optimal, i.e. same as or less than the predetermined packet-size.

At operation block 306, a notification may be sent to a requestor indicating status of the current RLP packet-size. In one embodiment, the requestor is a device such as a mobile communication device or a base station self device.

If the packet-size comparison determined at operation block 305 results in the packet-size for the current RLP packet being different from the optimal packet-size, then the current RLP packet-size is said to be incompatible for the current channel condition.

Alternately, if the current RLP packet-size is greater than an optimal packet-size, the RLP packet-size is said to be incompatible for the current channel condition. The notification to the sender indicates that the current RLP packet-size is incompatible and is larger or smaller than the optimal packet-size. The notification to the sender is sent using the packet alteration logic 207. In one uses standard header format and existing control messages for notification. Performance of operation block 306 depends on the configuration of the system.

Alternatively, a notification is not sent. In this embodiment, if a packet-size does not match the optimal predetermined packet-size then the packet will not be send forward and placed in a waiting area. The requestor realizing that the packet had not been sent forward, a request to modify the packet is sent to attain an optimal packet-size.

At operation block 307, a request is sent by a requestor to change the packet-size of the current RLP packet. Packet alteration logic 207 is used to send the request. Packet alteration logic 207 uses existing control messages and indicates that the current RLP packet-size be changed to reflect the optimal packet-size.

At operation block 309, the request for change of current RLP packet-size is received. The request is processed to determine if the request is within a predetermined number of requests allowed by the system. This predetermined number is different for all systems and depends upon the overload handling capacity of the system. If the request is within the predetermined number then it is allowed for forwarding for further processing. If the request exceeds the allotted number of predetermined requests then the request is denied.

At operation block 311, the allowed request is processed. The packet-size indicated in the request to change packet-size is compared with the current RLP packet-size. If the current RLP packet-size is not same as the optimal packet-size or alternately not the same or less than the optimal packet-size, then the request is processed. If the current RLP packet-size is same, as the optimal packet-size, then the request to change packet-size is denied.

At operation block 313, a consensus is reached for changing the current RLP packet-size, or alternately the same and or less than the optimal packet-size. If the current RLP packet-size is not same as predetermined optimal packet-size then the request from the requestor indicating change of current packet-size to attain optimal packet-size is granted and an agreement is reached between the packet-size optimization logic 205 and the requester.

At operation block 315, parameters of the current RLP packet are changed. The parameters are changed to increase or decrease the current RLP packet-size to make it the same size as the optimal packet-size. In this embodiment, also cyclic redundancy check (CRC) bits are added to each RLP packet. Adding CRC bits to an RLP packet enables error-checking to be performed and minimizes the frequency a packet is discarded due to errors. Typically, CRC bits are added only to a control type RLP packet and not a data type RLP packet.

At operation 317, an optimal RLP packet is sent to the requestor. The optimal RLP packet is the current RLP packet that has been changed in size to reflect an optimal packet-size.

Figure 4:
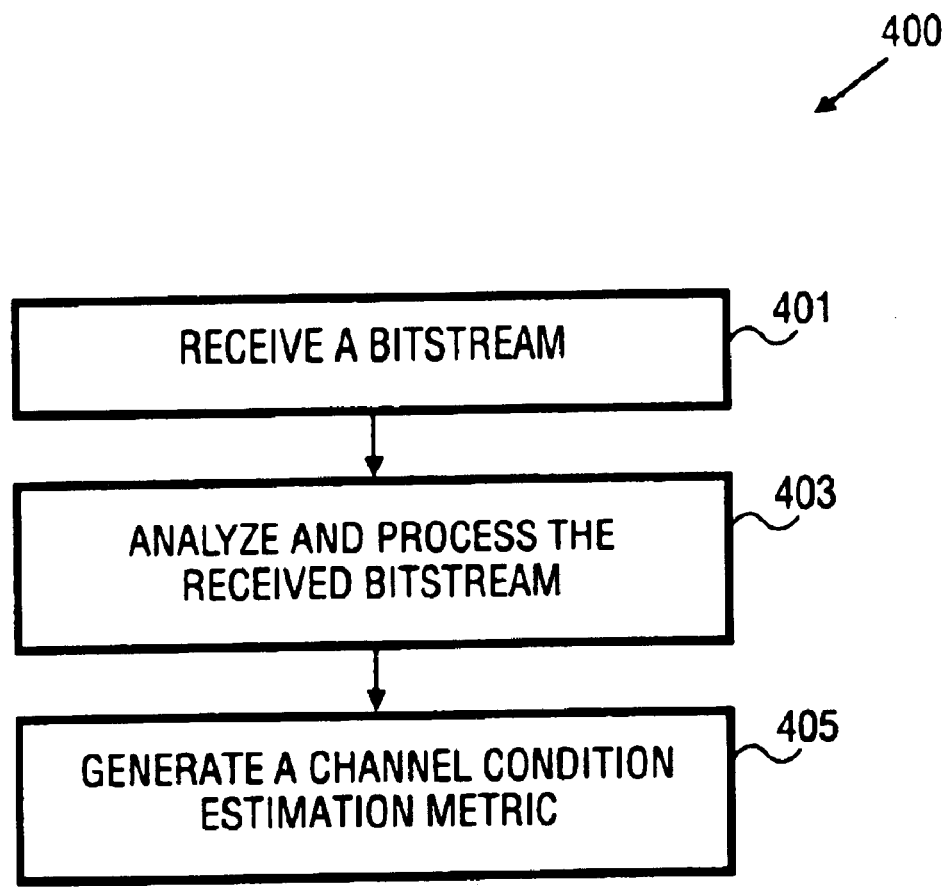
FIG. 4 is a flow chart of one embodiment of an operation to generate a channel condition metric for a current bitstream.

FIG. 4 is a flow chart of an operation 400 to generate a channel condition metric for a current bitstream according to one embodiment. Operation 400 also allows processing of the current bitstream to compute the current estimated error rate of the bitstream and to use it to compute channel condition estimation metric.

Referring to FIG. 4, at operation block 401, a current bitstream is received. In one embodiment, a physical layer frame of a modem converts a signal received at the input 201 into the current bitstream. The current bitstream as indicated earlier contains several RLP packets. One embodiment of a physical layer frame is further shown in FIG. 5.

At operation block 403, the current bitstream is analyzed and processed. The bitstream is analyzed to determine a data error rate. The analysis consists of sampling the portion of the current bitstream a predetermined period of time. The size of the sample (corresponding to the predetermined period of time) is sufficient to complete the error rate. In one embodiment the sample size is 20 ms. The error rate is used to compute the current error rate of the bitstream, and the current error rate is used to compute an estimated error rate for the entire bitstream. The estimated error rate is calculated using a probability theory and approximates error rate of upcoming portions of the bitstream.

At operation block 405, a channel condition estimation metric is generated. The function of a channel condition estimation metric is to indicate or predict the occurrence of a frame or bit error in the current bitstream and is used to determine the size of the packet to implant. The channel condition estimation metric is generated using the current estimated error of the bitstream.

A channel condition estimation metric may be calculated using one or more metrics including frame error rate (FER) metric, signal to noise ratio estimate (SNR) metric, energy per bit (Eb)/Thermal noise (Nt) estimate metric, and system time and/or finger time drift rate.

The FER metric is the frame error rate over a given period of time and may be computed by the following formula which may be computed directly from the current bitstream:

FER=# Frames with error for a given period/Total # of frames received for a given period.

A frame is considered to have an error if the frame does not pass a CRC check. FER can be computed directly from the current bitstream.

Thus, the FER metric value indicates the probability of error occurrence in a frame and is used to optimize RLP packet in the current bitstream.

A measurement of noise in the current bitstream is also necessary to compute a SNR metric. SNR effects both Bit Error Rate (BER) and Frame Error Rate (FER) and an SNR metric value is used to optimize RLP packets within the current bit stream.

A measurement of noise in the current bitstream is also necessary to compute the Eb/Nt. metric Eb/Nt metric value effects both Bit Error Rate (BER) and Frame Error Rate (FER) and an Eb/Nt metric value is used to optimize RLP packets within the current bit stream.

The system time or finger time drift rate metric is a timing adjustment made for a given interval. System time or finger time drift rate metric also indicates speed or movement of the bitstream and also types of fading in the bitstream.

A channel condition estimation metric can be any one a combination of any metrics such as the four metrics described herein.

In one embodiment, the channel condition metric is a compilation of the four metrics. This may be computed by using the following formula:

$$w1*SNR+w2*(Eb/Nt)+w3*FER+w4*\text{System time drift rate}+w5*\text{finger time drift}$$

Where w1, w2, w3, w4 and w5 are predetermined fixed weights.

Figure 5:
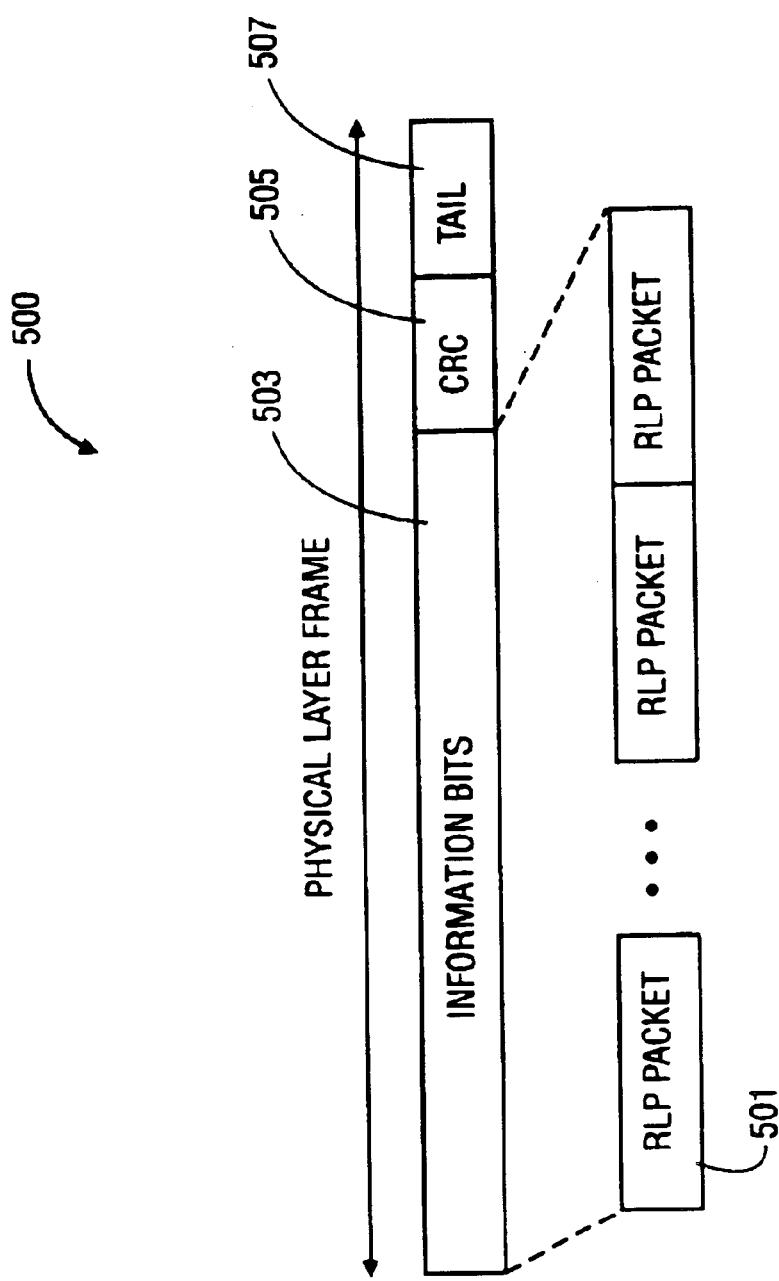
FIG. 5 is a block diagram of an exemplary physical layer frame according to one embodiment.

FIG. 5 is a block diagram 500 of an exemplary physical layer frame according to one embodiment. Physical frame layer performs baseband processing to convert a baseband signal into a bitstream. The physical layer frame includes several RLP packets 501, information bits 503 representing the RLP packets, a cyclic redundancy check (CRC) 505 coupled to the information bits 503, and a tail 507 coupled to the CRC 505.

An RLP packet 501 is represented by information bits 503. Information bits include data. A CRC 505 coupled to information bits 503 allows detection of bit errors and frame errors. A physical layer frame includes only one CRC 505.

A tail 507 coupled to a CRC 505 consists of fixed bit values. The fixed bit values are used to bring a convolutional encoder in a system to a known stage.

Figure 6:
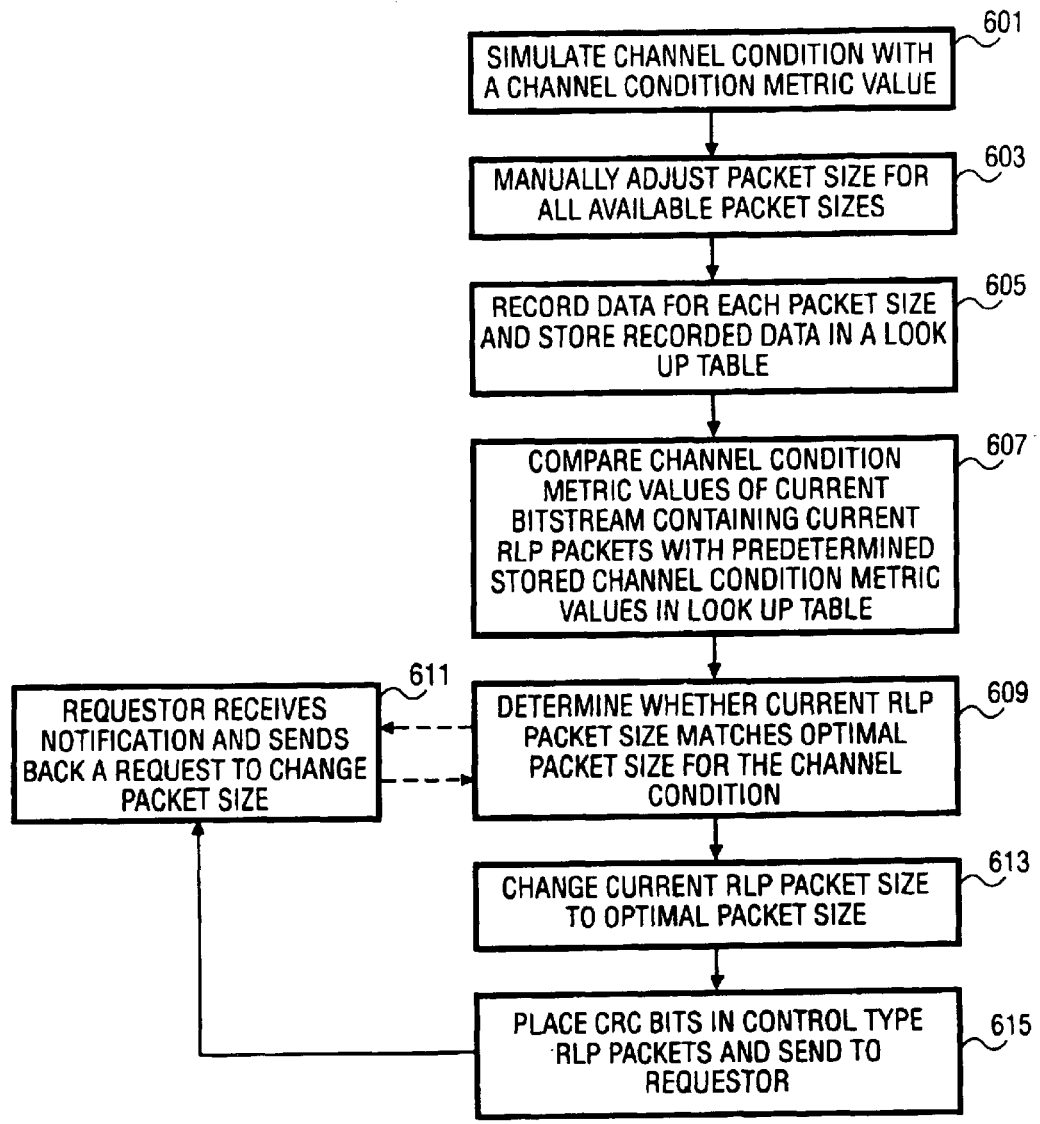
FIG. 6 is a flow chart of one embodiment of an operation to optimize a current RLP packet-size to an optimal packet-size using the packet-size optimization logic.

FIG. 6 is a flow chart of one embodiment of an operation to optimize a current RLP packet-size to an optimal packet-size using the packet-size optimization logic. In this embodiment, operation 600 also performs an empirical experimentation which consists of changing the RLP packet-size by simulating a channel condition, and manually adjusting packet-sizes corresponding to the channel condition.

At operation block 601, a channel condition is simulated using a channel condition metric value. The channel condition metric value is used to balance the trade-off between CRC and re-transmission overhead. Re-transmission overhead is overhead associated with re-transmitting the error-laden packet. Overall bit rate re-transmitting affects the bit rate by making the bit rate slower. Purpose of this simulation is to generate a table for all possible channel condition metric values and packet sizes that are optimal for those channel condition metric values. A channel condition is therefore simulated for all channel condition metric values. The simulated channel condition represents a condition that would exist in real life under the particular channel condition metric value.

At operation block 603, packet-size is adjusted for a particular channel condition metric value. The packet-size adjustment reflects the optimal packet-size that would be compatible with a particular channel condition and produce the maximum system throughput. All possible packet sizes available are adjusted for each channel condition metric value to obtain optimal packet-size for any channel condition metric value possible in the system. The adjustment of packet-sizes is performed manually. The packet-size is adjusted according to the following formula:

Expected Raw throughput=Pr(no frame error)×Number of information bits/time interval=$(1-Pe)^{n/k} \times (np-npo-nro \times k)$/physical frame duration Where np=# of bits in physical layer frame npo=# of overhead bits in physical layer frame nro=# of overhead bits in RLP packet Pe=probability of bit error k=# of RLP packets per physical layer frame The formula also assumes that a constant BER with uncorrelated bit errors exists.

At operation block 605, data for each packet-size and channel condition metric value is recorded. The recorded packet-size data and channel condition metric value data are stored in a lookup table. The lookup table is categorized according to all possible channel condition metric values such that an optimal packet-size can be found for any channel condition metric value by looking up the channel condition metric value. Alternatively, a lookup table can also be categorized under packet-sizes such that a metric value associated with the optimal packet-size can be found by looking up any packet-size.

At operation block 607, a channel condition metric for a current bitstream is received. The channel condition metric for the current bitstream containing current At operation block 609, the channel condition metric value for the current bitstream is compared with the predetermined channel condition metric values that are simulated earlier. In one embodiment, the comparison is performed by matching the current channel condition metric value a channel condition metric value and pre-computed packet-size, such as the lookup table values discussed above. The optimal packet-size corresponding to the matched channel condition metric is compared with the current RLP packet-size from the current bitstream.

At operation block 611, a determination is made whether the current RLP packet-size matches the predetermined packet-size that is optimal for use in the current channel condition for maximizing the system throughput. In one embodiment, if the packet-size of the current RLP packet is different from the predetermined optimal packet-size then the current packet-size is incompatible for the current channel condition. In case of incompatibility, a notification is sent to the requester using existing header and control messages indicating that the incompatibility of the current RLP packet.

At operation block 613, the requester receives the incompatibility information from the packet-size optimization logic 205. The requester responds back to the packet-size optimization logic 205 with a request to change the current RLP packet-size to the predetermined optimal packet-size. Alternatively, the requester sends the request to change current RLP packet to the packet alteration logic 207.

Alternatively, the system can be configured such that no notification is sent to the requester at operation block 611. In this case the packet-size optimization logic 205 having determined that the current RLP packet-size is incompatible with the optimal packet-size places the current RLP packet in a waiting area and waits until it receives a request from the requester to change the current RLP packet-size to a size compatible with the optimal size.

At operation block 615, the current RLP packet-size is changed to the predetermined optimal packet-size.

At operation block 619, the optimal RLP packet is sent to the requestor. As discussed previously, CRC bits are placed in a control type optimal RLP packets. The optimal RLP packet with CRC bits is the current RLP packet that has been changed in size to reflect optimal packet-size and placed with CRC bits for error correction capability.

Figure 7:
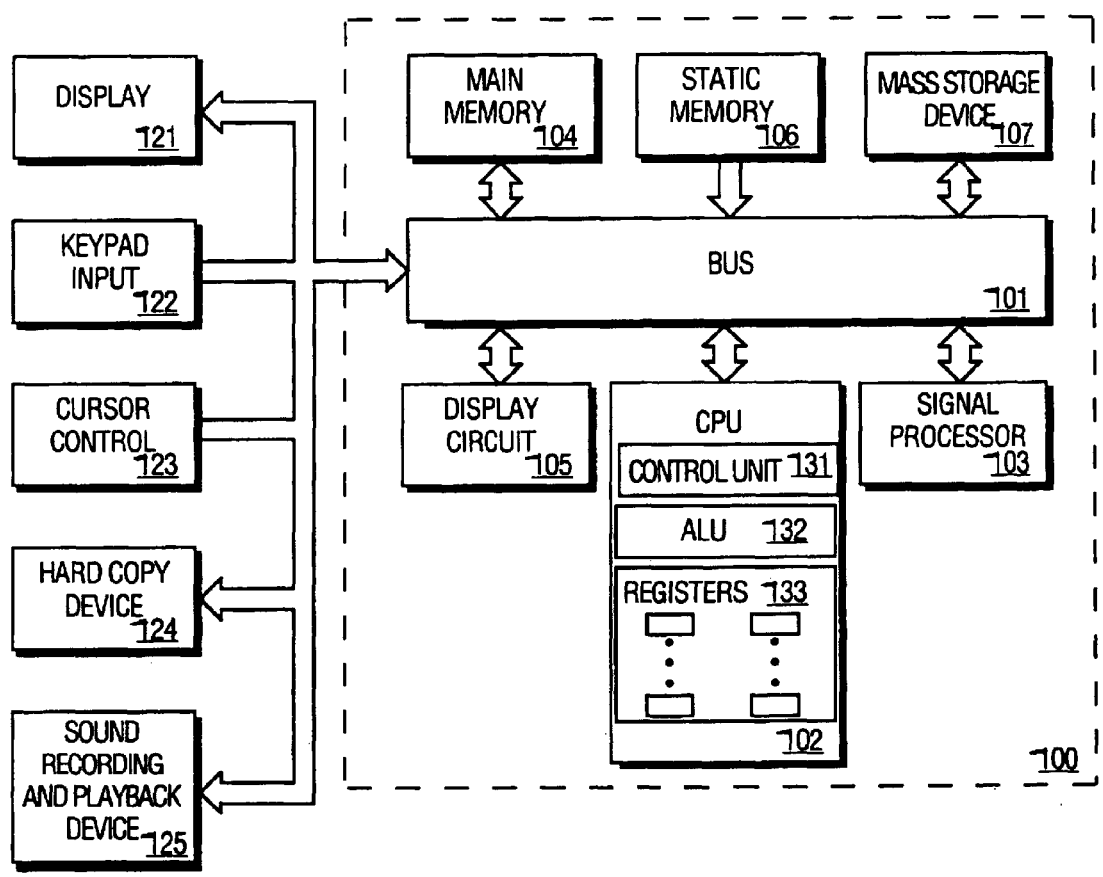
FIG. 7 is an exemplary digital processing system for practicing one embodiment.

FIG. 7 is an exemplary digital processing system for practicing one embodiment. The packet-size optimization process described herein can be implemented and utilized within digital processing system 700, which can represent a general purpose computer, portable computer, hand-held electronic device, or other like device. The components of digital processing system 700 are exemplary in which one or more components can be omitted or added. For example, one or more memory devices can be utilized for digital processing system 700.

Referring to FIG. 7, digital processing system 700 includes a central processing unit 702 and a signal processor 703 coupled to a display circuit 705, main memory 704, static memory 706, and mass storage device 707 via bus 701. Digital processing system 700 can also be coupled to a display 721, keypad input 722, cursor control 723, hard copy device 724, input/output (I/O) devices 725, and audio/speech device 726 via bus 701.

Bus 701 is a standard system bus for communicating information and signals. CPU 702 and signal processor 703 are processing units for digital processing system 700. CPU 702 or signal processor 703 or both can be used to process information and/or signals for digital processing system 700. Signal processor 703 can be used to process RLP packets and bitstream information and signals for RLP packets and bitstream optimization process. Alternatively, CPU 702 can be used for optimizing packet-size. CPU 702 includes a control unit 731, an arithmetic logic unit (ALU) 732, and several registers 733, which are used to process information and signals. Signal processor 703 can also include similar components as CPU 702.

Main memory 704 can be, e.g., a random access memory (RAM) or some other dynamic storage device, for storing information or instructions (program code), which are used by CPU 702 or signal processor 703. For example, main memory 704 may store speech or audio information and instructions to be executed by signal processor 703 to process the RLP packets and bitstream information. Main memory 704 may also store temporary variables or other intermediate information during execution of instructions by CPU 702 or signal processor 703. Static memory 706, can be, e.g., a read only memory (ROM) and/or other static storage devices, for storing information or instructions, which can also be used by CPU 702 or signal processor 703. Mass storage device 707 can be, e.g., a hard or floppy disk drive or optical disk drive, for storing information or instructions for digital processing system 700.

Display 721 can be, e.g., a cathode ray tube (CRT) or liquid crystal display (LCD). Display device 721 displays information or graphics to a user. Digital processing system 701 can interface with display 721 via display circuit 705. Keypad input 722 is a alphanumeric input device for communicating information and command selections to digital processing system 700. Cursor control 723 can be, e.g., a mouse, a trackball, or cursor direction keys, for controlling movement of an object on display 721. Hard copy device 724 can be, e.g., a laser printer, for printing information on paper, film, or some other like medium. A number of input/output devices 725 can be coupled to digital processing system 700. For example, a speaker can be coupled to digital processing system 700. Audio/speech device 726 can be, e.g., a microphone with an analog to digital converter, for capturing sounds of speech in an analog form and transforming the sounds into digital form, which can be used by signal processor 703 and/or CPU 702, for packet-size optimizing.

The packet-size optimizing techniques described herein can be implemented by executing code or instructions stored in a machine-readable medium coupled with or contained in digital processing system 700. For example, CPU 702 or signal processor can execute the code or instructions stored in main memory 704 to optimize a packet-size. The machine-readable medium can include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

What is claimed is:

1. A method comprising:
   generating a metric to indicate a channel condition based on an estimated error rate;
   processing the metric to determine optimal packet-size for the channel condition, the processing comprising:
   receiving the metric corresponding to the channel condition, and
   using the received metric to balance a trade-off between the cyclic redundancy
   check and re-transmission overhead; and
   choosing the optimal packet-size corresponding to the processed metric to send to a requestor.

2. The method of claim 1, wherein choosing the optimal packet comprises training a neural network or look-up table to optimally improve system data throughput selecting a packet corresponding to the channel condition.

3. The method of claim 1, wherein the optimal packet-size is a packet-size that minimizes both cyclic redundancy check and re-transmission overhead.

4. The method of claim 1, wherein the estimated error rate is a weighted combination of a frame error rate (FER), a signal to noise ratio (SNR) estimate, an energy per bit (Eb)/thermal noise (Nt) estimate, and a system time or finger time drift rate.

5. The method of claim 1, wherein the estimated error rate is selected from a group consisting of frame error rate (FER), signal to noise ratio estimate (SNR), energy per bit (Eb)/Thermal noise (Nt) estimate, and system time or finger time drift rate.

6. An apparatus comprising:
   a memory to store a metric and packet; and
   a processor to generate a metric indicating a channel condition based on an estimated error rate, to process the metric to determine optimal packet-size for the channel condition, and to choose the optimal packet-size corresponding to the processed metric to send to a requestor;
   wherein the processor receives the metric corresponding to the channel condition, and uses the received metric to balance trade-off between the cyclic redundancy check and re-transmission overhead.

7. The apparatus of claim 6, wherein the processor trains a neural network or look-up table to optimally improve system data throughput by selecting a packet corresponding to the channel condition.

8. The apparatus of claim 6, wherein the processor chooses an optimal packet-size that minimizes both cyclic redundancy check and re-transmission overhead.

9. The apparatus or claim 6, wherein the processor computes the estimated error rate as a weighted combination of a frame error rate (FEF), a signal to noise ratio (SNR) estimate, an energy per bit (Eb)/thermal noise (Nt) estimate, and a system time or finger time drift rate.

10. The apparatus of claim 6, wherein the estimated error rate is one of a frame error rate (FER), a signal to noise ratio estimate (SNR), an energy per bit (Eb)/Thermal noise (Nt) estimate, and a system time or finger time drift rate.

11. A storage medium having stored therein a plurality of machine executable instructions, wherein when executed, the instructions performing operations comprising:
   generating a metric to indicate a channel condition based on an estimated error rate;
   processing the metric to determine optimal packet-size for the channel condition; and
   choosing the optimal packet-size corresponding to the processed metric to send to a requestor;
   wherein the instructions performing processing the metric comprises instructions, when executed, performing operations comprising:
      receiving the metric corresponding to the channel condition, and
      using the received metric to balance trade-off between the cyclic redundancy check and re-transmission overhead.

12. The storage medium of claim 11, wherein the instructions performing choosing the optimal packet comprises instructions, when executed, performing operations comprising training a neural network or look-up table to optimally improve system data throughput by selecting a packet corresponding to the channel condition.

13. A method comprising:
   estimating likelihood of packet transmission error in a system;
   determining a radio link protocol (RLP) packet-size corresponding to the estimated likelihood of packet transmission error, the determining the RLP packet-size comprising:
      allowing a base station or mobile data transmission system to request a change for
      the RLP packet-size, and
      selecting the RLP packet from a predetermined table that corresponds in size to
      the size requested by the base station or mobile data transmission system; and
   sending a RLP packet having size corresponding to the RLP packet-size to a base station or a mobile data transmission system;
   wherein the base station or mobile data transmission request is limited to a predetermined number of requests.

14. An apparatus comprising:
   a memory to store RLP packets; and
   a processor to estimate likelihood of packet transmission error in a system, to determine a radio link protocol (RLP) packet-size corresponding to the estimated likelihood of packet transmission error, and to send a RLP packet having size corresponding to the RLP packet-size to a base station or mobile data transmission system;
   wherein th processor allows the base station or mobile data transmission system to request a change for the RLP packet-size, selects the RLP packet from a predetermined table that corresponds in size to the size requested by the base station or mobile data transmission system, and limits the request from the base station or mobile data transmission to a predetermined number of requests.

15. The A storage medium having stored therein a plurality of machine executable instructions, wherein when executed, the instructions performing operations comprising:
   estimating likelihood of packet transmission error in a system;
   determining a radio link protocol (RLP) packet-size corresponding to the estimated likelihood of packet transmission error; and
   sending a RLP packet having size corresponding to the RLP packet-size to a base station or a mobile data transmission system;
   wherein the instructions performing determining the RLP packet-size comprises instructions, when executed, performing operations comprising:
      allowing the base station or mobile data transmission system to request a change
      for the RLP packet-size, and
      selecting the RLP packet from a predetermined cable that corresponds in size to
      the size requested by the base station or mobile data transmission system; and
   the base station or mobile data transmission system is limited to a predetermined number of requests.

16. A method comprising:
   storing at least one radio link protocol (RLP) packet in a physical layer; and
   pre-determining a RLP packet-size by empirical experimentation; the pre-determining the RLP packet-size comprising:
      simulating a condition with a particular metric value,
      adjusting packet-size manually corresponding to the metric value, and
      recording packet-size data for the metric value to obtain maximum system throughput.

17. The method of claim 16, wherein the predetermining comprises storing a metric value in a lookup table and obtaining an optimum packet-size corresponding to the stored metric value.

18. The method of claim 16, wherein the RLP packet includes cyclic redundancy check bits to provide error-checking capability for the RLP packet.

19. An apparatus comprising:
   a memory to store an radio link protocol (RLP) packet, and data from an empirical experimentation; and
   a processor to store at least one RLP packet in a physical layer, and to predetermine the RLP packet size by the empirical experimentation;
   wherein the processor performs the empirical experimentation, simulates a condition with a particular metric value, adjusts packet-size manually corresponding to the metric value, and records packet-size data for the metric value for obtaining maximum system throughput.

20. The apparatus of claim 19, wherein the processor stores a metric value in a lookup table and obtains an optimum packet-size corresponding to the stored metric value.

21. The apparatus of claim 19, wherein the RLP packet includes cyclic redundancy check bits to provide error-checking capability for the RLP packet.

22. A storage medium having stored therein a plurality of machine executable instructions, wherein when executed, the instructions perform operations comprising:
   storing at least one radio link protocol (RLP) packet in a physical layer; and predetermining the RLP packet-size by an empirical experimentation;
wherein the instructions performing predetermining the RLP packet-size comprises instructions, when executed, performing operations comprising:
simulating a condition with a particular metric value,
adjusting packet-size manually corresponding to the metric value, and
recording packet-size data for the metric value to get maximum system throughput.

23. The storage medium of claim 22, wherein the instructions performing predetermining the RLP packet-size comprises instructions, when executed, performing operations comprising storing a metric value in a lookup table and obtaining an optimum packet-size corresponding to the stored metric value.

24. The storage medium or claim 22, wherein the RLP packet includes cyclic redundancy check bits to provide error-checking capability for the RLP packet.

25. A method comprising:
generating a metric to indicate a channel condition based on an estimated error rate;
processing the metric to determine optimal packet-size for the channel condition; and
choosing the optimal packet-size corresponding to the processed metric to send to a requestor;
wherein the optimal packet-size is a packet-size that minimizes both cyclic redundancy check and re-transmission overhead.

26. The method of claim 25 wherein the estimated error rate is a combination of at least a frame error rate (FER), a signal to noise ratio estimate (SNR), an energy per bit (Eb)/Thermal noise (Nt) estimate, and a system time or finger time drift rate.

27. A method comprising:
generating a metric to indicate a channel condition based on an estimated error rate;
processing the metric to determine optimal packet-size for the channel condition; and
choosing the optimal pocket-size corresponding to the processed metric to send to a requestor;
wherein the estimated error rate is a weighted combination of a frame error rate (FER), a signal to noise ratio (SNR) estimate, an energy per bit (Eb)/thermal noise (Nt) estimate, and a system time or finger time drift rate.

28. The method of claim 27 wherein the optimal packet-size is a packet-size that minimizes both cyclic redundancy check and re-transmission overhead.

29. An apparatus comprising:
a memory to store a metric and packet; and
a processor to generate a metric indicating a channel condition based on an estimated error rate, to process the metric to determine optimal packet-size for the channel condition, and to choose the optimal packet-size corresponding to the processed metric to send to a requestor;
wherein the processor chooses an optimal packet-size that minimizes both cyclic redundancy check and re-transmission overhead.

30. The apparatus of claim 29 wherein the processor computes the estimated error rate as a combination of at least a frame error rate (FER), a signal to noise ratio estimate (SNR), an energy per bit (Eb)/Thermal noise (Nt) estimate, and a system time or finger time drift rate.

31. An apparatus comprising:
a memory to store a metric and packet; and
a processor to generate a metric indicating a channel condition based on an estimated error rate, to process the metric to determine optimal packet-size for the channel condition, and to choose the optimal packet-size corresponding to the processed metric to send to a requestor;
wherein the processor computes the estimated error rate as a weighted combination of a frame error rate (FEF), a signal to noise ratio (SNR) estimate, an energy par bit (Eb)/thermal noise (Nt) estimate, and a system time or finger time drift rate.

32. The apparatus of claim 31 wherein the processor chooses an optimal packer-size that minimizes both cyclic redundancy check and re-transmission overhead.

* * * * *